(12) United States Patent
Ueno

(10) Patent No.: US 6,888,847 B2
(45) Date of Patent: May 3, 2005

(54) PACKET TRANSFER METHOD AND APPARATUS

(75) Inventor: Hiroshi Ueno, Tokyo (JP)

(73) Assignee: NEC Corporation, Tokyo (JP)

( * ) Notice: Subject to any disclaimer, the term of this patent is extended or adjusted under 35 U.S.C. 154(b) by 833 days.

(21) Appl. No.: 09/907,668

(22) Filed: Jul. 19, 2001

(65) Prior Publication Data

US 2002/0009050 A1 Jan. 24, 2002

(30) Foreign Application Priority Data

Jul. 21, 2000 (JP) ........................................ 2000-220617

(51) Int. Cl.[7] .............................. H04J 3/16; H04J 3/22
(52) U.S. Cl. ....................... 370/469; 370/470; 370/389; 370/413; 709/223; 709/230; 709/236; 711/211; 711/216; 711/132
(58) Field of Search ................................ 370/230, 235, 370/389, 413, 329, 393, 401, 469, 470, 471, 395.5, 395.1, 395.51; 711/211, 212, 216, 221, 132; 709/223, 229, 230, 236

(56) References Cited

U.S. PATENT DOCUMENTS 6,148,376 A * 11/2000 Claassen ..................... 711/132

6,778,546 B1 * 8/2004 Epps et al. .................. 370/413
6,826,196 B1 * 11/2004 Lawrence .................... 370/466

FOREIGN PATENT DOCUMENTS

| JP | 6-301650 A | 10/1994 |
| JP | 8-292908 A | 11/1996 |

* cited by examiner

Primary Examiner—Wellington Chin
Assistant Examiner—Raj Jain
(74) Attorney, Agent, or Firm—Sughrue Mion, PLLC

(57) ABSTRACT

To provide a communication apparatus that can relieve the processing load when packet transfer is made with hardware. A packet transfer apparatus includes an input buffer for storing temporarily an input packet, an address acquiring section for acquiring the information needed for the transfer, a retrieval circuit for retrieving the information regarding the output with the acquired destination address as a key, a label insertion circuit for encapsulating a packet with the labels in the maximum number of stack layers M designated for a packet group having a unit of destination address, and a switch section for switching the encapsulated packet to a desired output destination port.

11 Claims, 4 Drawing Sheets

EXP : EXPERIMENTAL USE
S : BOTTOM OF STACK
TTL : TIME TO LIVE

US 6,888,847 B2

PACKET TRANSFER METHOD AND APPARATUS

BACKGROUND OF THE INVENTION

1. Field of the Invention

The present invention relates to a packet transfer method and apparatus.

2. Description of the Prior Art

A transfer method for the IP traffic that has recently gained attention is an MPLS (Multi Protocol Label Switching) transfer method that has been standardized in the IETF (Internet Engineering Task Force). In the MPLS, the packet is transferred by referring to a numerical value of fixed length called a label for routing the packet between label switching routers.

One of the features of the MPLS is the hierarchy of labels. Namely, the labels are layered, each layer being managed individually, whereby a labeled packet can be tunneled through a network. That is, a packet is encapsulated with a new label while a label value attached before is kept, and the packet is transferred through the network by referring to the label value at the initial position. In this way, a route within the network can be set up independently for each layer.

The layered labels made in the above way can provide a great advantage, but in the encapsulation for appending the label or the decapsulation, a step of inserting or deleting the label into or from the header of packet is required. For this step, however, there is a drawback that a queue buffer is needed, and the insertion or deletion of label may be different for each input label, whereby this step is inappropriate for the router operation for switching with the hardware.

In the MPSL standards, the output processing is determined by referring to the initial position of an input label. The output processings include a label exchange, a label stack deletion (pop), and a label stack addition (push). The label exchange is replacing an output label resulting from the retrieval of an input label with the input label. The label stack deletion is deleting the initial label, but consequently the retrieval must be made again, employing the initial label obtained or the IP address of an IP packet encapsulated. Namely, the packet must be stored in the buffer, until the ultimate output information is determined by the retrieval. Also, the label stack addition is adding a label entry to the initial position of the labels attached previously. In this case, the transmission of the packet must be kept waiting for a time period of inserting a new label. Hence, there is a queuing process in the buffer.

In this way, each step is simple, but to implement the above steps with the hardware in the router (packet switch), the steps become more complex. In particular, there is a problem that it takes a lot of processing time to make the pop operation of label stack.

BRIEF SUMMARY OF THE INVENTION

1. Object of the Invention

It is an object of the present invention to provide a packet transfer method and apparatus that can relieve the processing load of the apparatus for performing the packet transfer with the hardware.

2. Summary of the Invention

A packet transfer method of the present invention has a feature that the label stack entries in the maximum number of label layers determined for each destination on the basis of the settings are appended at an entrance edge node into a packet transfer network. Also, the initial label position of the label stack entries in multiple layers is pointed to by a pointer bit, and an equivalent process to the addition/deletion of label stack entry can be effected by incrementing or decrementing the value of this pointer bit.

A plurality of labels are appended at an entrance edge into the packet switch network, and the transfer within the network is determined by referring to a label pointed to by the pointer bit value. The addition/deletion of label stack entry is implemented by incrementing or decrementing the pointer bit value. In this way, the addition or deletion of label stack entry in the transfer node involves changing the point bit value alone but making neither deletion nor addition or insertion of the physical label stack entry.

This invention has another feature that the maximum number of layers for a certain known destination is set at an input node into the network by making the setting from a network management terminal or communicating the protocol between switches, and the maximum number of label stack entries are inserted in encapsulation.

Also, this invention has another feature that to indicate which stack position is initial, the label position to be referred to is designated employing the pointer bit. At an intermediate node, an equivalent process to the insertion or deletion of label is performed by incrementing or decrementing the pointer bit value.

BRIEF DESCRIPTION OF THE DRAWINGS

This above-mentioned and other objects, features and advantages of this invention will become more apparent by reference to the following detailed description of the invention taken in conjunction with the accompanying drawings, wherein.

DETAILED DESCRIPTION OF THE PREFERRED EMBODIMENTS

Preferred embodiments of the present invention will be described below with reference to the drawings.

Figure 1:
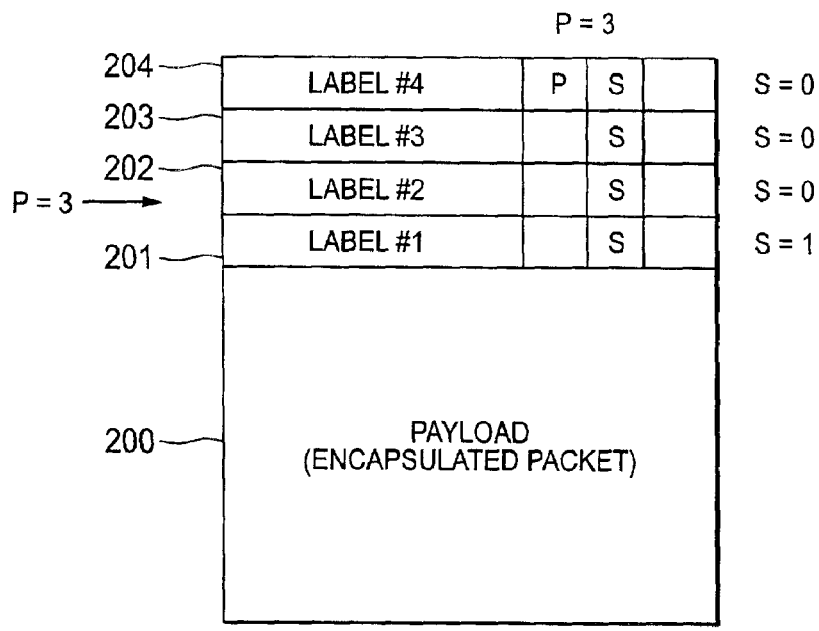
FIG. 1 is a diagram showing the configuration of a labeled packet according to the present invention.

FIG. 1 shows the configuration of a labeled packet according to the invention. The labeled packet is composed of a payload portion (encapsulated packet) 200 and the label stack entries in multiple layers that are appended to its initial position. FIG. 1 shows an instance of the labels of four layers (201 to 204). When the P (pointer) value written in a stack entry at the initial position of the packet is three, an effective label is located at the third stage from the top of the packet, or a label entry 202 (label #2). Also, the S bit of a last label stack entry is set to 1, indicating the end of label stack entry (i.e., the number of entries is four in FIG. 1).

Figure 2:
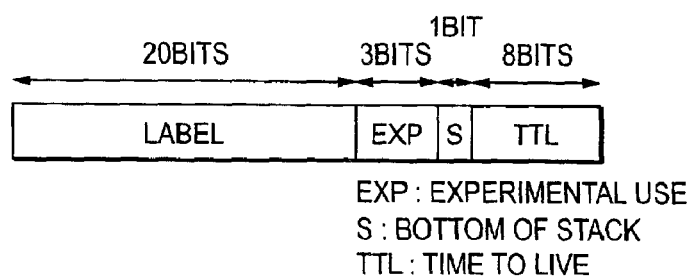
FIG. 2A is a configuration diagram of a label stack entry as defined in the MPSL.
FIG. 2B is a configuration diagram of a label stack entry according to the invention.
Figure 2:
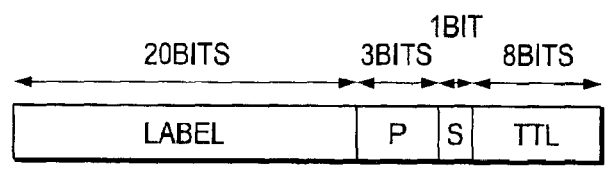

FIG. 2 shows the definition of a label stack entry. FIG. 2A is a diagram of the label stack entry as defined in the MPLS (Multi Protocol Label Switching) that is examined in the IETF (Internet Engineering Task Force). For an entry of 32 bits, the label is 20 bits, the experimental preliminary area (EXP) is 3 bits, the S bit indicating the end of stack is 1 bit, and the field carrying the TTL (Time to Line) value is 8 bits. On the other hand, FIG. 2B shows the definition of a label stack entry according to the invention. A different point from FIG. 2A is that the EXP area is defined as a pointer value P. The pointer value P is employed to indicate at which layer from the top the initial position of label stack is located.

Figure 3:
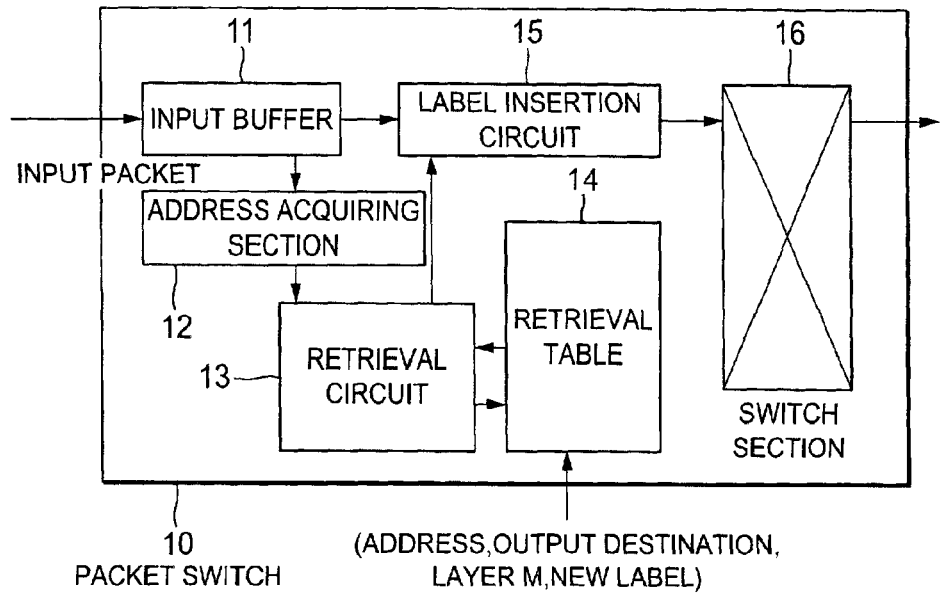
FIG. 3 is a block diagram of a packet switch (input edge node)

FIG. 3 shows the configuration of an input edge node in a packet switch according to the invention. The packet switch 10 comprises an input buffer 11 for storing temporarily an input packet, an address acquiring section 12 for acquiring a destination address from a header part of the input packet, a retrieval table 14 describing a destination address and an output destination port, the number of layers in a label stack entry to be appended, and the correspondence of the output information including a new label to be appended, a retrieval circuit 13 for retrieving the retrieval table employing the destination address acquired in the address acquiring section to obtain the output information, a label insertion circuit 15 for inserting a label stack entry indicated by the output information obtained in the retrieval into an initial position of the packet, and a switch section 16 for switching the output information to a desired output destination port. The retrieval table 14 stores the entries for acquiring the output information from the destination address of an input packet. The output information may include the output destination port, the number of layers M in a stack entry to be appended, and the new label to be appended (plural entries possible). For example, in writing additionally two stages of label stack entries, two sorts of new labels are employed.

Figure 4:
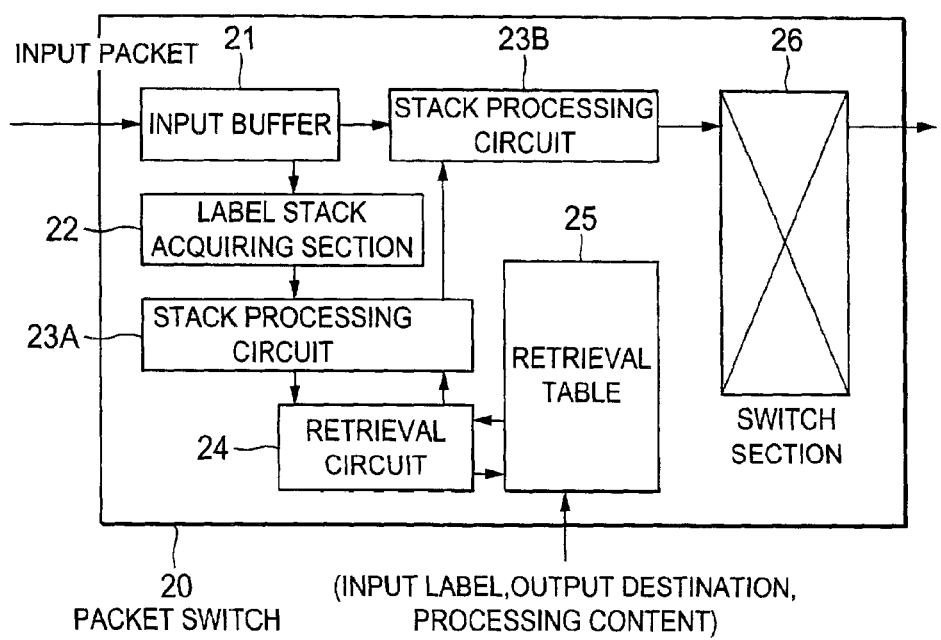
FIG. 4 is a block diagram of a packet switch (intermediate node)

FIG. 4 shows the configuration of an intermediate node in a packet switch according to the invention. The packet switch 20 further comprises an input buffer 21 for storing temporarily an input packet, a label stack acquiring section 22 for acquiring a label stack entry of the input packet, a first stack processing circuit 23A for making a judgement of operation employing the acquired label stack entry, a retrieval circuit 24 for retrieving the retrieval table employing the input label, a second stack processing circuit 23B for making a stack operation such as a label exchange, on the basis of the retrieval result, and a switch section 26 for switching the output information to a desired output destination port. The retrieval table 25 stores the entries for acquiring the output information from the label value of an input packet. The output information may include the output destination port, the processing for the label (label exchange/label push/label pop), and the new label.

Figure 6:
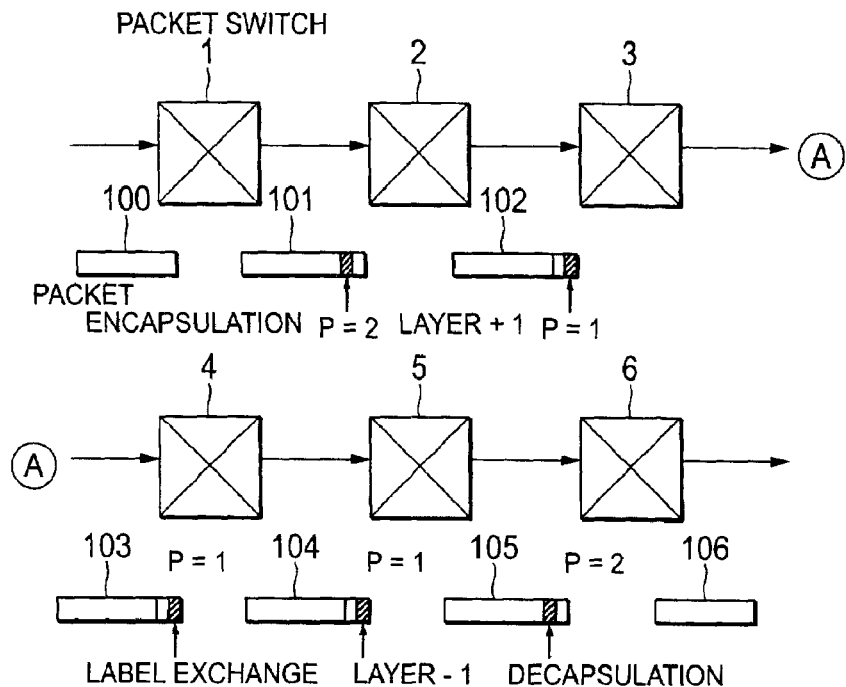
FIG. 6 is a concept view of the packet transfer.

FIG. 6 shows a concept view of the packet transfer in a packet switch network according to the invention. The packet switch network as shown in FIG. 6 comprises a packet switch 1 that is an input node of the transferred packet such as an IP packet, the packet switches 2 to 5 that are intermediate nodes, and a packet switch 6 that is an output node of the transferred packet. For an input packet 100 into the switch 1, the output packets from the respective switches 1 to 6 are denoted by 101 to 106 in the figure.

The operation of a packet switch 10 as shown in FIG. 3 will be described below. An input packet is temporarily stored in the input buffer 11, and the information needed for the transfer is acquired in the address acquiring section 12. In the case where the input packet is an IP packet, the destination IP address of the IP header is taken out. At this time, more detailed information (transmission IP address, TCP/UDP port number) can be employed as the transfer information. Employing the destination address acquired herein, the retrieval table 14 is retrieved in the retrieval circuit 13.

The retrieval circuit 13 acquires the information regarding the output with the destination address as a key. The output information is predetermined in accordance with the management information of the apparatus, or a label assignment protocol, and stored in the retrieval table 25. To be important here is to specify the maximum number of stack layers M for a packet group having a certain destination. On the basis of this maximum number of stacks M, the label stack entries of M layers are inserted into the input packet at the initial position, as shown in FIG. 1. In FIG. 1, an instance of M=4 is shown. In the case where one sort of label is appended to the output packet, a new label value is written into an entry of layer M (last label), and the P value of an entry of layer 1 (first label) is changed to M. In the case where two sorts of labels are appended to the output packet, the new label values are written into the entries of layer M and layer M-1, and the P value of the entry of layer 1 is changed to M-1. A packet encapsulated in the label insertion circuit 15 is transferred via the switch section 16 to a desired output destination port.

The operation of a packet switch (intermediate node) 20 as shown in FIG. 4 will be described below. An input packet is temporarily stored in the input buffer 21, and the information needed for the transfer is acquired in the label stack acquiring section 22. Herein, a label stack entry appended to the initial position of packet is taken out. The processing for the label stack entry taken out is performed in the stack processing circuits 23A and 23B. The processing here will be described later. The retrieval process is performed in the retrieval circuit 24 and the retrieval table 25, with the label that is judged to be referred to by the stack processing circuits 23A and 23B as a key, to retrieve the information regarding the output. The information regarding the output may include a label processing (relabelling/push/pop), a new label, and an output port. The packet that has undergone the labeling operation in the stack processing circuits 23A and 23B is transferred via the switch section 26 to a desired output port.

Figure 5:
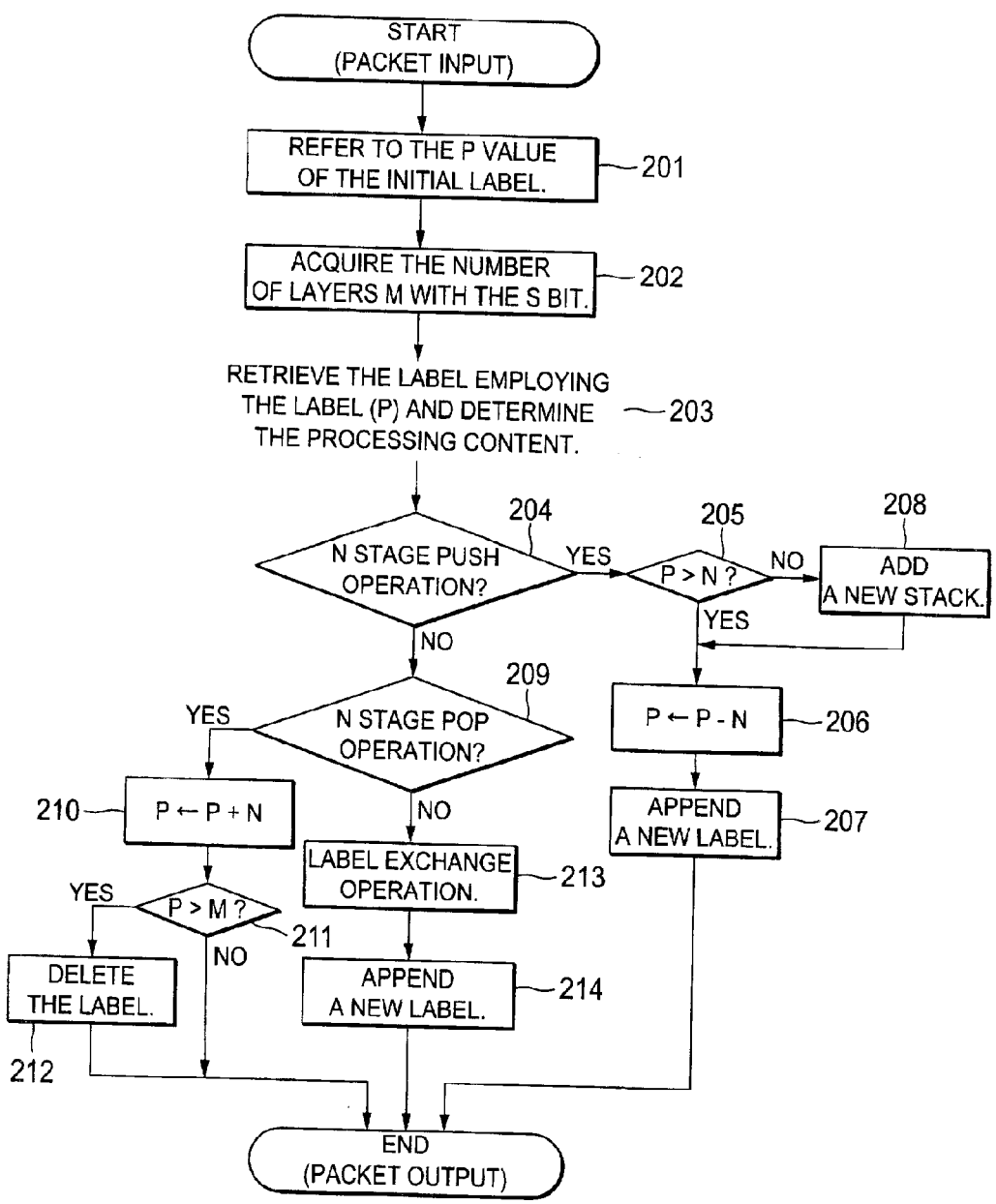
FIG. 5 is a flowchart of the operation of a stack processing circuit.

The internal processing (packet processing) of the stack processing circuits 23A and 23B will be described below using a flowchart of FIG. 5. A packet input into the packet switch firstly refers to the P value in the initial label stack entry (step 201). Also, the label stack with the S bit of 1 is determined to acquire the number of label layers M (step 202). Then, the label at the position indicated by the P value is taken out and the retrieval is performed employing this label (step 203). As a result of label retrieval, any one of the addition (push of N layers) of label stack entry, the deletion (pop of N layers) of label stack entry, and the label exchange can be attained.

The addition (push of N layers) process of label stack entry is shown at steps 204 to 208. In this case, if the push operation of N layers is involved, as a result of label retrieval, the information including the new label at the time of output and the interface of the output destination is obtained. First of all, it is confirmed that the P value is greater than N. In the packet transfer method of this invention, because the maximum number of layers is reserved for each destination, this condition normally does not occur. However, if the P value is smaller than N, a new label stack entry is added (step 208). After checking at step 205, the P value is decremented by N to refer to the new stack position (step 206). A new label is appended to the stack at a position pointed to by the new P value obtained here (step 207), and an output packet is formed.

The deletion (pop of N layers) process of label stack entry is shown at steps 201 to 212. In this case, if the pop operation of N layers is involved, as a result of label retrieval, the information including the interface of the output destination is obtained. In order to delete the label stack entry, the P value is incremented by N to change the stack position to be referred to (step 210). Thereby, the P value can point to the new stack position, but if the P value is greater than a total number of layers M (step 211), the label stack entry is unnecessary, and hence all the label stack entries appended to a payload are deleted (step 212).

In the case of the label exchange, the label at the position pointed to by the P value is exchanged to a new label, and an output packet is formed (steps 213, 214).

Referring now to FIG. 6 showing a concept view of the packet switch network, the relabelling according to the invention will be described below by way of example with the transfer on the network. In a packet switch 1, an input packet (e.g., IP packet) is subjected to encapsulation designated by a retrieval result of the destination address. In FIG. 6, the label stack entries of two layers are appended to the input packet 100, and a new label is assigned to the layer 1 at the last position, indicating that the layer 1 is the initial label with P=2. In a packet switch 2, the retrieval is made employing the label value (P=2: layer 1) indicated by the P value, so that it is found that the destination is a packet switch 3, and one label layer is added (one push) Herein, the P value is decremented by 1, anew label is assigned to the layer 2 (initial position), and P is set to 1. In the packet switches 3, 4, the label retrieval is made by referring to the label of layer 2 and the relabelling to the new label is performed. In a packet switch 5, the label retrieval of layer 2 is made, so that it is found that one label layer is deleted (one pop). Thus, the P value is incremented by 1, so that P is equal to 2. Thereby, in a packet switch 6 at the next stage, the label of layer 1 is referred to. In the case where this packet switch involves deleting one label layer (one pop), meaning the deletion of the encapsulation with the label, the label stack area of two layers is deleted, and a packet is output from the packet transfer network (packet 106).

Figure 7:
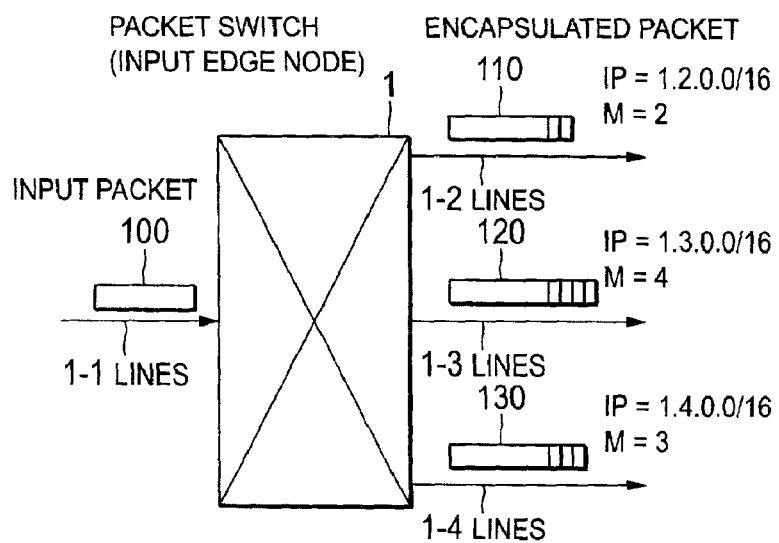
FIG. 7 is a diagram illustrating an example of changing the number of layers N.

Referring to FIG. 7, there will be described an instance in which the number of stack layers is different depending on the output destination for the input IP packet in the packet switch network 1 (input edge node). The lines of the packet switch include an input line 1-1 and the output lines 1-2, 1-3, and 1-4. When an input packet 100 from the input line 101 is encapsulated, the output line is set to 1-2, and the number of stacks to be appended M is set to 2, in the case where the destination IP network address is 1.2.0.0 and the net-mask is 255.0.0.0, or the IP network address is indicated by 1.2.0.0/16. If the destination is at the IP network address indicated by 1.3.0.0/16, the output line is set to 1-3 and the number of stacks to be appended M is set to 4. If the destination is at the IP network address indicated by 1.4.0.0/16, the output line is set to 1-4 and the number of stacks to be appended M is set to 3. In this way, the maximum number of layers M can be varied according to the destination, on the basis of the settings from the management terminal or the control protocol between switches. Thereby, the bands of the line can be prevented from being wasted.

With the packet transfer method of the invention, the pointer bit in each packet switch must be interpreted. Therefore, unused stacks are removed at a boundary node (packet switch) with the conventional MPLS transfer node. That is, when the pointer bit P is N, the label stack entries from the initial position to N- are unused, and their entry fields are deleted, whereby the packet can be transferred employing the transfer node in accordance with the MPLS standards.

Also, when a packet is input from the MPLS transfer node to the packet transfer network of this system, an EXP bit of a label stack entry at the initial position is reread as P, and P=1 is substituted. At this time, if the M value is already known, an empty label layered entry can be added, or the same processing as an input edge node (a packet switch 10 in FIG. 3) into the network can be effected.

Though the preferred embodiment of the present invention has been described above, the invention is not limited to the above embodiment, and may be possible so far as a fixed number of label stack entries for each unit of destination is added at an edge node and the position of initial label used can be recognized. Further, the information corresponding to the P bit or S bit in an example may be attached in a predetermined header part of packet or other parts of packet to transfer the packet.

Also, the number of label stack entries added at an edge node, which is determined for each unit of destination, may not be necessarily different for each destination, and the same number of label stack entries for the packet transferred within the packet transfer network may be added. The unit of destination can be grouped in a unit of sub-net or a fixed range of numerical values as in the example. Though in this invention, the label operation is implemented with the hardware, a part of the processing in the invention may be implemented with the software.

As described above, with the invention, the number of layers specified beforehand according to the destination are appended to an edge node, and at the time of transfer within the packet switch network, an area assigned to the entries is always fixed, and the addition or deletion of label entry area is not made. Therefore, the processing load can be relieved at the time of transfer with the hardware.

What is claimed is:

1. A packet transfer method comprising setting the number of layers in a label stack entry to be appended for each unit of packet destination, and appending label stack entries of said number of label layers at an entrance edge node into a packet transfer network.

2. The packet transfer method according to claim 1, further comprising indicating an initial label position of a plurality of layers in said label stack entry employing a pointer bit, and performing an equivalent process to the addition/deletion of stack by increasing or decreasing the value of said pointer bit.

3. The packet transfer method according to claim 2, further comprising:

an address acquiring step of acquiring a destination address from a header part of an input packet;

a retrieval step of retrieving an output destination port, the number of layers in a label stack entry to be appended, and the correspondence of the output information including a new label to be appended from said acquired destination address;

a label insertion step of inserting a label stack entry indicated by the output information obtained in said retrieval step into a packet at an initial position; and a switch step of switching said packet having said label stack entry appended to pass the output information to a desired output destination port.

4. The packet transfer method according to claim 3, further comprising:

a label stack acquiring step of acquiring a label stack entry of an input packet;

a first stack processing step of judging a stack processing, employing said acquired label stack entry;

a retrieval step of retrieving a retrieval table describing an output destination port, a processing for a label and a new label, employing an input label;

a second stack processing step of performing a stack processing, employing a result of retrieval in said retrieval step; and a switch step of switching the output information to a desired output destination port.

5. The packet transfer method according to claim 4, wherein said first stack processing step comprises:

a step of referring to a pointer bit value in an initial label stack entry of an input packet;

a step of acquiring the number of label layers from S bits and taking out a label at a location pointed to by said pointer bit value; and a step of retrieving said retrieval table from a retrieval circuit using said label as a key and judging a processing content;

said second stack processing step comprises:

a step of adding a new label stack entry, decrementing the pointer value by N, referring to a new stack position, appending the new label to said new stack position, and forming an output packet, if said pointer value is greater than N, in the case where the processing content is the addition of a label stack entry at N hierarchy, or the push operation at N hierarchy;

a step of incrementing the pointer value by N, changing the stack position to refer to, and if the stack value is greater than a total number of layers M, deleting all the label stack entries appended to a payload and forming an output packet, in the case where the processing content is the deletion of a label stack entry at N hierarchy, or the pop operation at N hierarchy; and a step of exchanging a label at a position pointed to by said pointer bit value to a new label and forming an output packet in the case where the processing content is the label exchange.

6. The packet transfer method according to claim 1, wherein said appended label stack entry is deleted at an exit edge node of said packet transfer network.

7. A packet transfer apparatus, wherein for a packet having appended the label stack entries in the number of label layers determined for each unit of destination an initial label position of said label stack entries is recognized employing a changeable pointer bit.

8. The packet transfer apparatus according to claim 7, further comprising:

an input buffer for storing temporarily an input packet;

an address acquiring section for acquiring a destination address from a header part of said input packet;

a retrieval table describing a destination address and an output destination port, the number of layers in a label stack entry to be appended, and the correspondence of the output information including a new label to be appended;

a retrieval circuit for retrieving said retrieval table employing the destination address acquired in said address acquiring section to obtain said output information;

a label insertion circuit for inserting a label stack entry indicated by the output information obtained in said retrieval into a packet at an initial position; and a switch section for switching the output information to a desired output destination port.

9. The packet transfer apparatus according to claim 7, further comprising:

an input buffer for storing temporarily an input packet;

a label stack acquiring section for acquiring a label stack entry of the input packet;

a first stack processing circuit for making a judgement of operation, employing the acquired label stack entry;

a retrieval table describing an output destination port, a label operation, and a new label;

a retrieval circuit for retrieving said retrieval table employing the input label;

a second stack processing circuit for making a stack operation, employing said retrieval result; and a switch section for switching the output information to a desired output destination port.

10. The packet transfer apparatus according to claim 9, wherein said first stack processing circuit comprises referring to a pointer bit value in an initial label stack entry of an input packet, acquiring the number of label layers from S bits and taking out a label at a location pointed to by said pointer bit value, retrieving said retrieval table from said retrieval circuit using said label as a key, and judging a processing content;

said second stack processing circuit comprises adding a new label stack entry, decrementing the pointer value by N, referring to a new stack position, appending the new label to said new stack position, and forming an output packet, if said pointer value is greater than N, in the case where the processing content is the addition of a label stack entry at N hierarchy, or the push operation at N hierarchy;

incrementing the pointer value by N, changing the stack position to refer to, and if the stack value is greater than a total number of layers M, deleting all the label stack entries appended to a payload and forming an output packet, in the case where the processing content is the deletion of a label stack entry at N hierarchy, or the pop operation at N hierarchy, and exchanging a label at a position pointed to by said pointer bit value to a new label and forming an output packet in the case where the processing content is the label exchange.

11. In a communication network comprising the packet transfer apparatus according to claim 7, a communication system for processing packets having label stack entries appended.

* * * * *